United States Patent
Nix et al.

(10) Patent No.: US 7,497,718 B2
(45) Date of Patent: Mar. 3, 2009

(54) ROUTING CLIP ELEMENTS WITH A LIVING HINGE AND INTERLOCKING CLOSURE

(75) Inventors: Gerald J. Nix, Fort Wayne, IN (US); Luis A. Torres, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 28 days.

(21) Appl. No.: 11/557,708

(22) Filed: Nov. 8, 2006

(65) Prior Publication Data

US 2008/0105796 A1    May 8, 2008

(51) Int. Cl.
*H01R 4/50* (2006.01)
(52) U.S. Cl. .................................... 439/347
(58) Field of Classification Search ............. 439/347, 439/350, 353, 355, 357, 361, 567; 362/396, 362/250
See application file for complete search history.

(56) References Cited

U.S. PATENT DOCUMENTS

| | | | | |
|---|---|---|---|---|
| 3,856,246 A | * | 12/1974 | Sinko | 248/68.1 |
| 4,306,697 A | * | 12/1981 | Mathews | 248/68.1 |
| 5,104,072 A | * | 4/1992 | Kuo et al. | 248/68.1 |
| 5,607,230 A | * | 3/1997 | Protz, Jr. | 362/396 |
| 5,669,709 A | * | 9/1997 | Adams | 362/396 |
| 5,992,802 A | * | 11/1999 | Campbell | 248/68.1 |
| 6,109,765 A | * | 8/2000 | Blanton | 362/250 |
| 6,889,944 B2 | * | 5/2005 | Brandzel et al. | 248/68.1 |
| 7,347,401 B1 | * | 3/2008 | Gretz | 248/68.1 |

* cited by examiner

*Primary Examiner*—Chandrika Prasad
(74) *Attorney, Agent, or Firm*—Mark C. Bach; Jeffrey P. Calfa; Gerald W. Askew

(57) ABSTRACT

A modular system of routing clip subcomponents having compatible interlocking features allows for as-needed assembly of multiple clips and extensions, thereby eliminating the need for specialized standoff brackets and clipping devices when routing vehicle wires, hoses, tubes, cables, harnesses, and the like. Generally molded from high-impact and decay resistant polymers, the elements of the modular system are inexpensive to manufacture and simple to assemble by hand.

17 Claims, 12 Drawing Sheets

MODULAR ROUTE AND CLIP SYSTEM

FIG. 1
PRIOR ART
ROUTING AND
CLIPPING INSTALLATION

FIG. 2
MODULAR ROUTE
AND CLIP SYSTEM

FIG. 3
MODULAR ROUTE AND
CLIP SYSTEM ASSEMBLED

FIG. 4
MODULAR ROUTE AND
CLIP SYSTEM USING POST
AND HOLE TYPE INTERLOCKING FEATURES

FIG. 5
MODULAR ROUTE AND CLIP
SYSTEM USING INTERLOCKING
T-SLOT

FIG. 6
MODULAR ROUTE AND CLIP
SYSTEM MOUNTING ELEMENT
WITH HOLE

FIG. 7
MODULAR ROUTE AND CLIP
SYSTEM MOUNTING ELEMENT
WITH HOLE WITH OVERMOLDED
INSERT

FIG. 8
MODULAR ROUTE AND CLIP
SYSTEM MOUNTING ELEMENT
WITH THREADED HOLE

FIG. 9
MODULAR ROUTE AND CLIP
SYSTEM MOUNTING ELEMENT
WITH PARENT-MATERIAL
THREADED STUD

FIG. 10
MODULAR ROUTE AND CLIP
SYSTEM MOUNTING ELEMENT
WITH OVERMOLDED
THREADED STUD

FIG. 11
MODULAR ROUTE AND CLIP
SYSTEM MOUNTING ELEMENT
WITH PRESS-IN FEATURE

FIG. 12
MODULAR ROUTE AND CLIP
SYSTEM MOUNTING ELEMENT
WITH ADHESIVE STRIPS

FIG. 13
MODULAR ROUTE AND CLIP
SYSTEM STRAIGHT ELEMENT

FIG. 14
MODULAR ROUTE AND CLIP
SYSTEM ANGLED ELEMENT

FIG. 15
MODULAR ROUTE AND CLIP
SYSTEM TWIST ELEMENT

FIG. 16
MODULAR ROUTE AND CLIP
SYSTEM ELBOW ELEMENT

FIG. 17
MODULAR ROUTE AND CLIP
SYSTEM TEE ELEMENT

FIG. 18
MODULAR ROUTE AND CLIP
SYSTEM CLIP ELEMENT - OPEN

FIG. 19
MODULAR ROUTE AND CLIP
SYSTEM CLIP ELEMENT - CLOSED

FIG. 20
MODULAR ROUTE AND CLIP
SYSTEM CLIP ELEMENT

FIG. 21
MODULAR ROUTE AND CHIP SYSTEM OBLIQUE CLIP ELEMENT

FIG. 22
MODULAR ROUTE AND CLIP SYSTEM ROTATABLE CLIP ELEMENT

FIG. 23
MODULAR ROUTE AND CLIP
SYSTEM SPRING CLIP
ELEMENT

ROUTING CLIP ELEMENTS WITH A LIVING HINGE AND INTERLOCKING CLOSURE

BACKGROUND OF THE INVENTION

1. Field of the Invention

This invention relates to vehicle hose, tube, and wiring clips or retainers, and more particularly, to a modular system of individual clip or retainer sub-components which can be assembled in multiple configurations in order to meet varying installation requirements. The sub-components are molded from plastic or similar material, and are formed in such a way that they snap easily and securely together, interchangeably. In this way, the need for vehicle manufacturers to manufacture and stock a large number of specialized clips, standoffs, and extensions is eliminated.

2. Description of the Related Art

Ground traveling vehicles possess a large number of wires, hoses, tubes, cables, electrical harnesses, lines, and the like, which must be carefully clipped and routed to avoid chafing, interference with vehicle componentry, or exposure to adverse environmental factors, such as high temperatures. In order to accomplish this, vehicle manufacturers utilize a tremendous variety of plastic and metal clips, zip-ties, retainers, brackets, standoffs, and fasteners. This is inefficient from a manufacturing standpoint, and results in greater costs to the vehicle manufacturer, both in the price of the individual components, as well as in overhead costs associated with inventory and distribution of service parts.

SUMMARY OF THE INVENTION

It is the object of the present invention to reduce or eliminate the number of routing clips and brackets used by vehicle manufacturers by providing a modular system of clip sub-components that can be assembled as needed in order to meet the majority of such routing and clipping requirements. In order to accomplish this, a series of interlocking molded polymer elements are used. Typically, the polymer selected will be high-impact and ultraviolet decay resistant. The elements may be divided into several types, including mounting elements, straight extension elements, angled elements, and clip elements. They are provided with a common set of interlocking features, such as a barbed protrusion or protrusions that fit into a recess or slot, or posts that fit into corresponding holes, or even a lateral T-section that slides into a corresponding lateral T-slot. In any given embodiment, the interlocking features are designed in such a way that the parts lock together when assembled, preferably with a positive audible or tactile feedback, such that the elements "snap-together". Further, the interlocking features may be configured so that they are releasable by manual manipulation, or by use of a tool.

The mounting element may simply be a body with a hole, which hole is provided in several common sizes, in increments of half a millimeter in the smaller sizes, full millimeters in the larger sizes, or sixteenths of an inch. In this way, a common fastener may be used to attach the mounting element to the vehicle. The mounting element may be provided with an overmolded metal insert for strength in compression, so that the common fastener may be tightened securely. The hole, whether in the parent molded material of the mounting element, or whether in the overmolded metal insert, may be threaded with or without a locking feature, so that only a male common threaded fastener need be used to attach the mounting element to the vehicle. The threads provided may be in metric or SAE standard. Alternately, the mounting element may be provided with a mounting stud, whether formed out of the parent molded material, or as an overmolded or otherwise attached metal insert. The stud may be provided in several sizes and lengths, with metric or SAE standard thread. Further embodiments of mounting elements include elements provided with a fir-tree or rosebud press-in type feature insertable into a hole provided in the vehicle structure, and elements provided with a high-bonding adhesive backing.

The extension elements are provided in incremental lengths of about fifteen millimeters or half an inch increments. Angled elements in the same way are molded in incremental angles of about fifteen degrees increment, except that a single smaller angle element may be available, such that the elements available may be 7.5°, 15°, 30°, 45°, and so forth. Further, one or more twist elements, or elements that change angle along the long axis, may be provided. Elbows and tees may be part of the set of modular elements as well.

The line clipping or retainer elements are generally cylindrical with a separation along one side, and a living hinge along the other, generally opposed side. There are interlocking closures between the two hinged halves, such that once the clip is closed around a hose or tube, it locks in the closed position. Similar to the interlocking features used to assemble the elements, the interlocking closures between the two hinged halves may be configured so that they are releasable by manual manipulation, or using a tool. The interlocking closures used to hold the line clip or retainer closed may be co-planar with the interlocking features used to assemble the elements, or the interlocking features used to assemble the elements may be located perpendicular to the interlocking closures. Further, the axis of the line clip or retainer may be oblique to the axis of the body of the modular clip element. The axis of the line clip or retainer may even be rotatable relative to the body of the modular clip element.

Another embodiment of the line clipping or retainer element involves the use of a resilient clip as is well-known in the industry, wherein the clip is generally cylindrical with an opening along its axis that is of a lesser distance that the diameter of the hose or tube to be inserted into it. Again, the axis of the line clip or retainer may be oblique to the axis of the body of the modular clip element.

DESCRIPTION OF THE INVENTION

Figure 1:
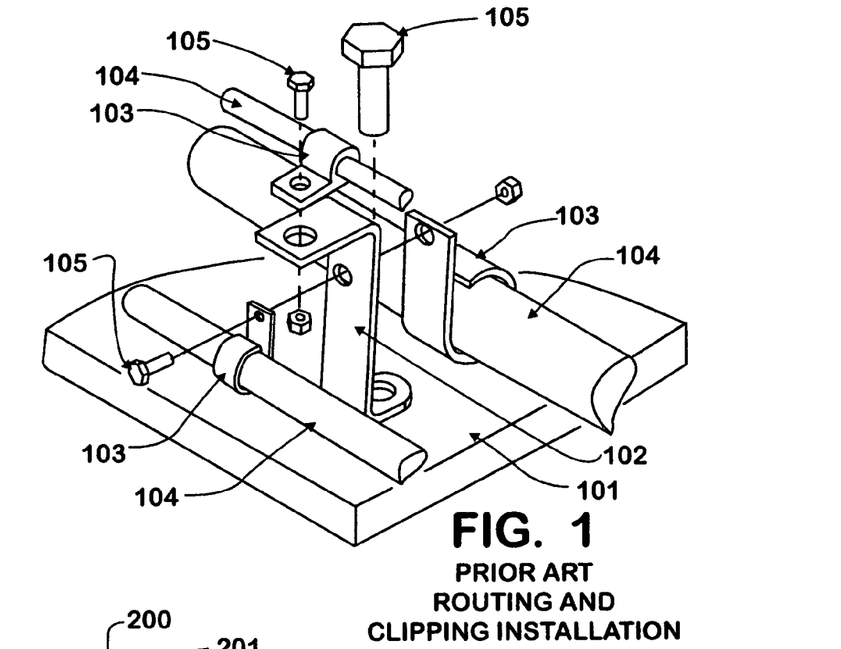
FIG. 1—Prior art routing and clipping installation.

FIG. 1 shows a typical prior art routing and clipping installation. A standoff bracket 102 of complex shape is attached to a vehicle mounting surface 101. Routing clips 103 of various sizes are attached to the standoff bracket 102, using common fasteners 105, also of various sizes. Lines to be routed 104 are securely held in place by the clips 103.

Figure 2:
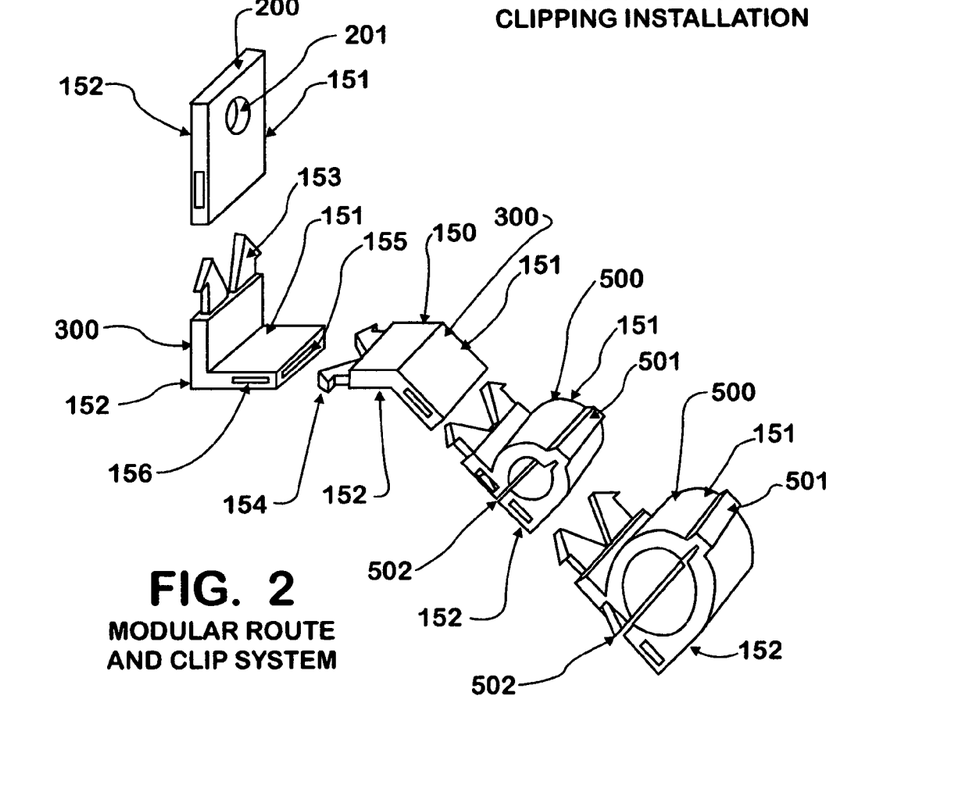
FIG. 2—A view of a first embodiment of the present invention

FIG. 2 shows an embodiment of the present invention, a modular route and clip system 150 comprised of modular route and clip system elements 151. Each modular route and clip system element 151 is provided with an element body 152 and interlocking features 153, by means of which the modular route and clip system elements 151 may be connected one to the next. The modular route and clip system elements 151 shown in FIG. 2 are shown projected from their assembled positions, so that the nature of their interlocking relationship may be more readily shown. The interlocking features 153 of the embodiment shown in FIG. 2 are made up of barbs 154 and compatible recesses 155, into which the barbs 154 are made to slide. Each recess 155 has barb holes 156, such that the barbs 154 are firmly retained in the recesses 155 once installed. Several different types of modular route and clip system elements 151 are shown, including mounting elements 200 having mounting holes 201, angled extension elements 300, and clip elements 500. The clip elements 500 are provided with living hinges 501 and interlocking closures 502, so that lines to be routed 104 (not shown) may be retained therein. Additional types of modular route and clip system elements 151 are disclosed in subsequent drawings.

Figure 3:
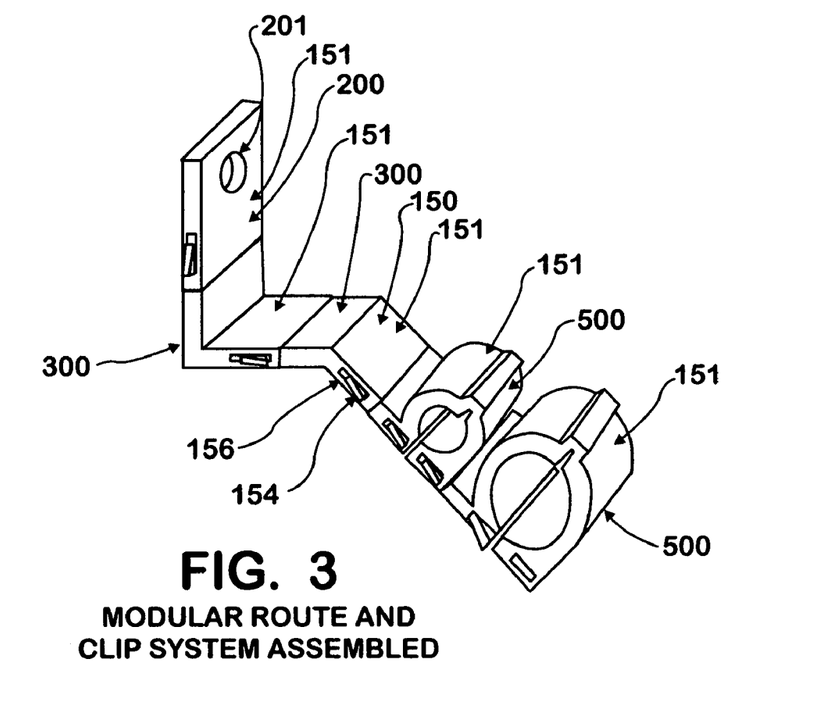
FIG. 3—A view of a second embodiment of the present invention.

FIG. 3 shows an embodiment of the present invention, a modular route and clip system 150 comprised of modular route and clip system elements 151, similar to the embodiment shown in FIG. 2, except that the embodiment shown in FIG. 3 is shown with the modular route and clip system elements 151 assembled and ready for installation. The barbs 154 of the interlocking features 153, which interlocking features 153 are not fully shown, are engaged to the barb holes 156, thereby firmly retaining one modular route and clip system element 151 to the next. Again, several different types of modular route and clip system elements 151 are shown, including mounting elements 200 having mounting holes 201, angled extension elements 300, and clip elements 500.

Figure 4:
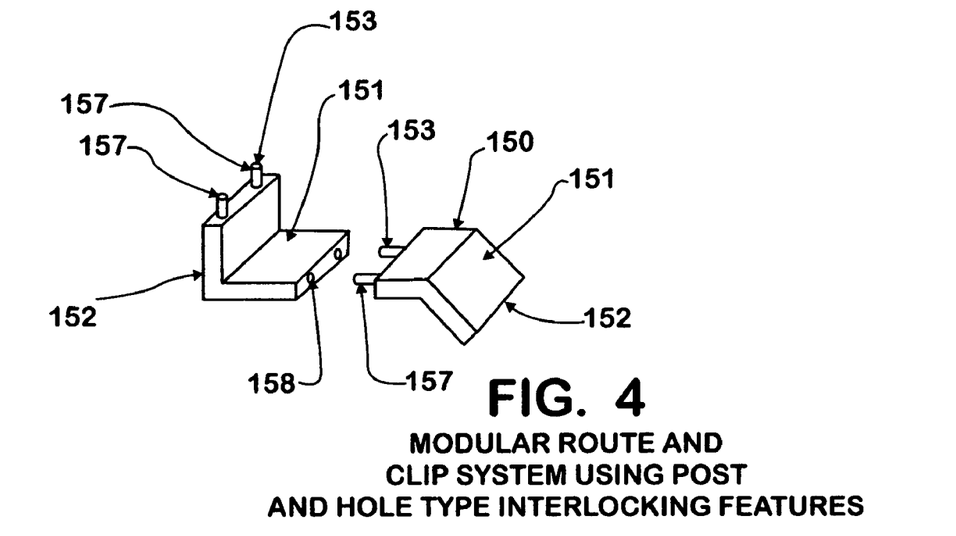
FIG. 4—A view of a third embodiment of the present invention.

FIG. 4 shows a partial view of an embodiment of the present invention, a modular route and clip system 150 comprised of modular route and clip system elements 151, similar to the modular route and clip system 150 shown in FIG. 2. Each modular route and clip system element 151 is provided with an element body 152 and interlocking features 153, by means of which the modular route and clip system elements 151 may be connected one to the next. The modular route and clip system elements 151 shown in FIG. 4 are again shown projected from their assembled positions, so that the nature of their interlocking relationship may be more readily shown. The interlocking features 153 of the embodiment shown in FIG. 4 are made up of posts 157 and post holes 158. The posts 157 are sized relative to the post holes 158 such that they must be pressed firmly together, and remain firmly attached once assembled.

Figure 5:
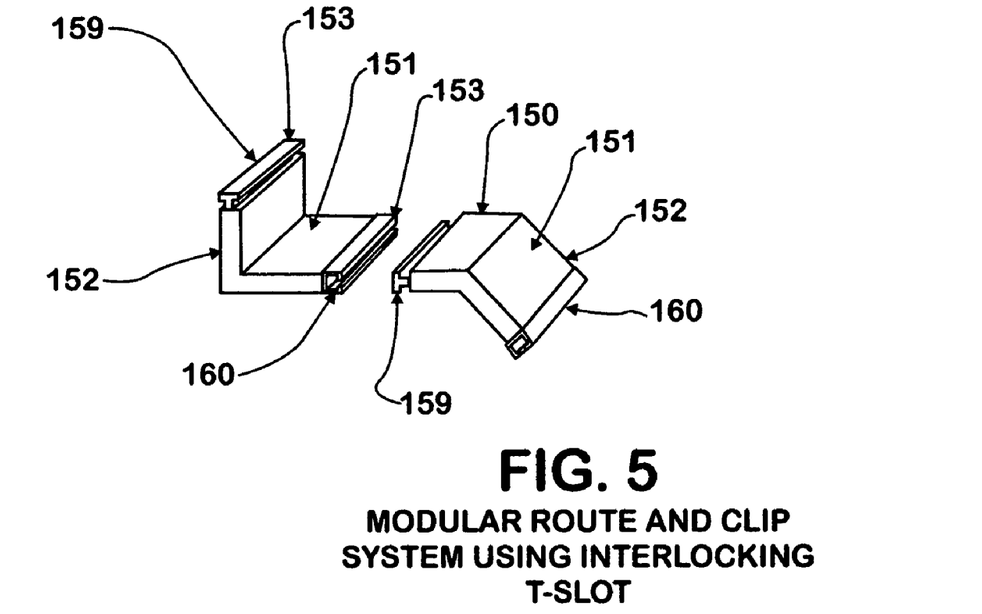
FIG. 5—A view of a fourth embodiment of the present invention.

FIG. 5 shows a partial view of another embodiment of the present invention, a modular route and clip system 150 comprised of modular route and clip system elements 151, similar to the modular route and clip system 150 shown in FIG. 2. Each modular route and clip system element 151 is provided with an element body 152 interlocking features 153, by means of which the modular route and clip system elements 151 may be connected one to the next. The modular route and clip system elements 151 shown in FIG. 5 are again shown projected from their assembled positions, so that the nature of their interlocking relationship may be more readily shown. The interlocking features 153 of the embodiment shown in FIG. 5 are made up of lateral T-sections 159 and lateral T-slots 160. Similar to the posts 157 and post holes 158 shown in FIG. 4, the lateral T-sections 159 and lateral T-slots 160 shown in FIG. 5 are sized such that they must be pressed firmly together, and remain firmly attached once assembled.

Figure 6:
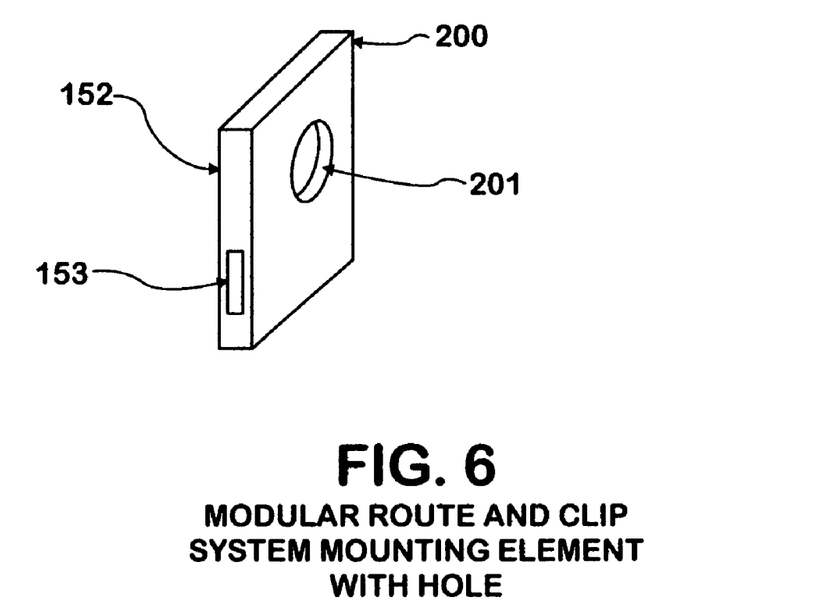
FIG. 6—A view of a fifth embodiment of the present invention.

FIG. 6 shows a view of a modular route and clip system mounting element 200, having a mounting hole 201. The modular route and clip system mounting element 200 has an element body 152 and interlocking features 153, which interlocking features 153 are only partially shown in FIG. 6. By means of the interlocking features 153, the modular route and clip system mounting element 200 may be connected to other modular route and clip system elements 151 (not shown). The diameter of the mounting hole 201 is provided in increments of half a millimeter in the smaller sizes, full millimeters in the larger sizes, or sixteenths of an inch, according to need.

Figure 7:
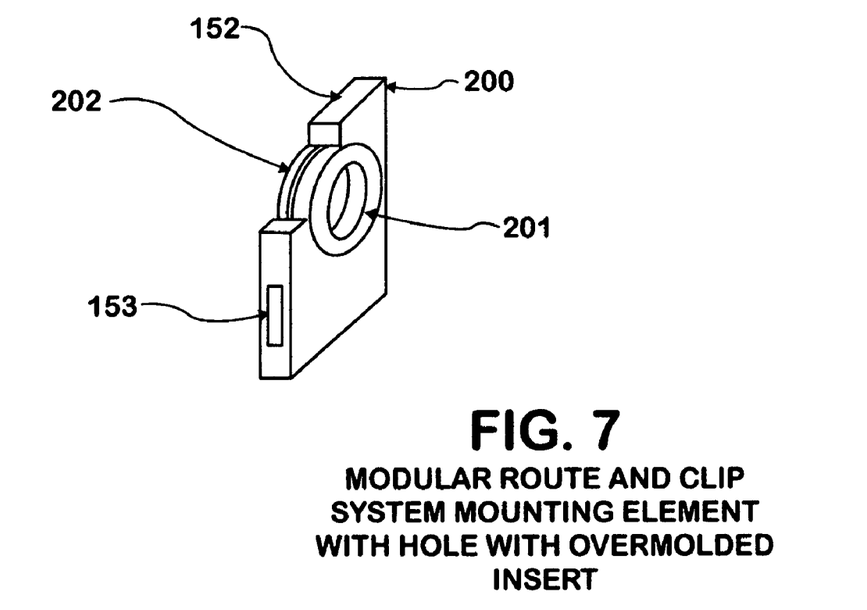
FIG. 7—A view of a sixth embodiment of the present invention.

FIG. 7 shows a partial cut-away view of a modular route and clip system mounting element 200, which modular route and clip system mounting element 200 is provided with a mounting hole overmolded insert 202. The modular route and clip system mounting element 200 has an element body 152 and interlocking features 153, which interlocking features 153 are only partially shown in FIG. 7. By means of the interlocking features 153, the modular route and clip system mounting element 200 may be connected to other modular route and clip system elements 151 (not shown). The mounting hole overmolded insert 202 functions to provide crush strength, so that the modular route and clip system mounting element 200 may be tightened securely against a mounting surface. The mounting hole overmolded insert 202 is provided with a mounting hole 201. The diameter of the mounting hole 201 is again provided in increments of half a millimeter in the smaller sizes, full millimeters in the larger sizes, or sixteenths of an inch, according to need.

Figure 8:
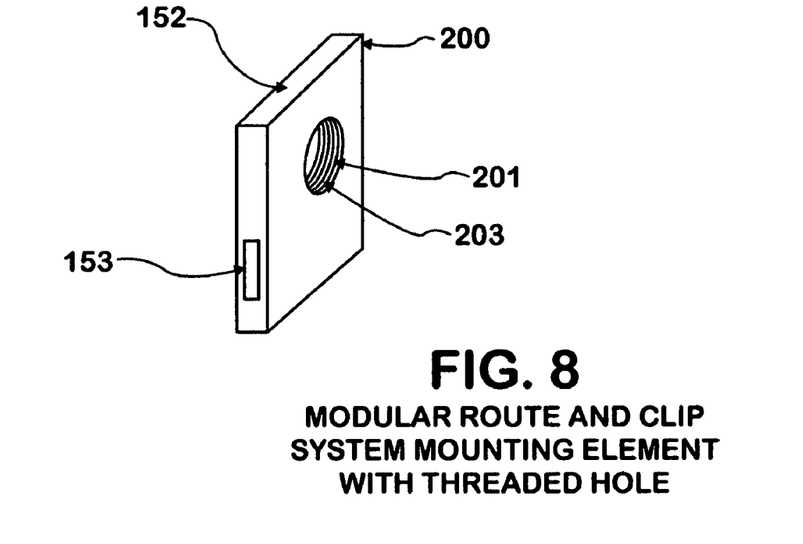
FIG. 8—A view of a seventh embodiment of the present invention.

FIG. 8 shows a view of a modular route and clip system mounting element 200, having a mounting hole 201. The modular route and clip system mounting element 200 has an element body 152 and interlocking features 153, which interlocking features 153 are only partially shown in FIG. 8. By means of the interlocking features 153, the modular route and clip system mounting element 200 may be connected to other modular route and clip system elements 151 (not shown). The mounting hole 201 is provided with screw threads 203. The screw threads 203 are provided in several common thread sizes, such as ¼"-20, ⁵⁄₁₆"-18, M6-1, M8-1.25, or M10-1.5, according to need.

Figure 9:
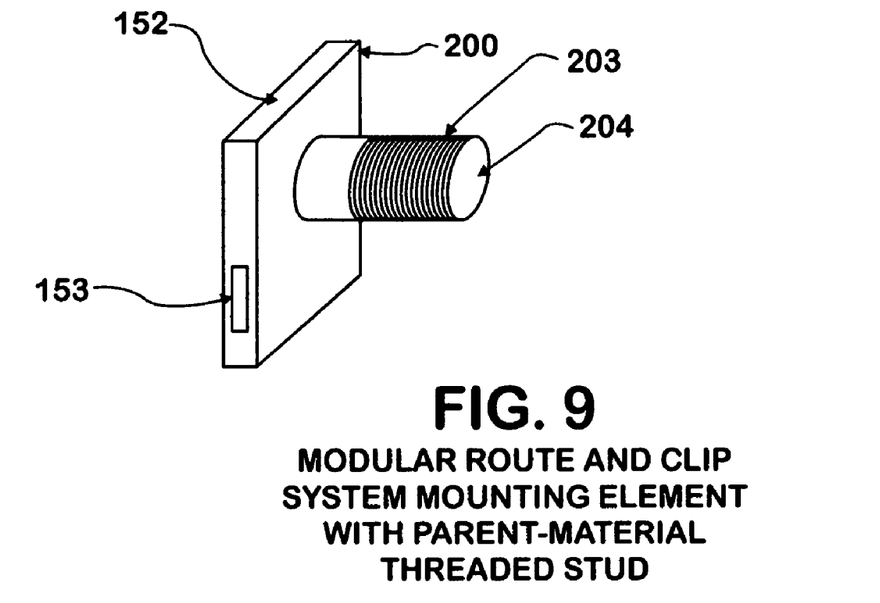
FIG. 9—A view of an eighth embodiment of the present invention.

FIG. 9 shows a view of a modular route and clip system mounting element 200 having a parent-material mounting stud 204. The modular route and clip system mounting element 200 has an element body 152 and interlocking features 153, which interlocking features 153 are only partially shown in FIG. 9. By means of the interlocking features 153, the modular route and clip system mounting element 200 may be connected to other modular route and clip system elements 151 (not shown). The parent-material mounting stud 204 is provided with screw threads 203. The screw threads 203 are provided in several common thread sizes, such as ¼"-20, ⁵⁄₁₆"-18, M6-1, M8-1.25, or M10-1.5, and the parent-material mounting stud 204 is provided in lengths of several increments, according to need.

Figure 10:
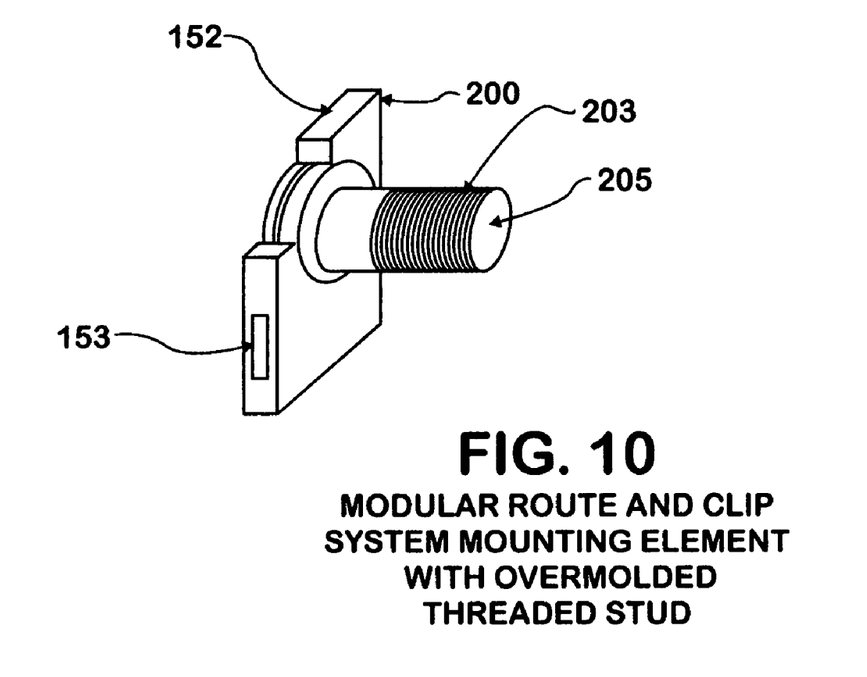
FIG. 10—A view of a ninth embodiment of the present invention.

FIG. 10 shows a partial cut-away view of a modular route and clip system mounting element 200 having an overmolded mounting stud 205. The modular route and clip system mounting element 200 has an element body 152 and interlocking features 153, which interlocking features 153 are only partially shown in FIG. 10. By means of the interlocking features 153, the modular route and clip system mounting element 200 may be connected to other modular route and clip system elements 151 (not shown). The overmolded mounting stud 205 is provided with screw threads 203. The screw threads 203 are provided in several common thread sizes, such as ¼"-20, ⁵⁄₁₆"-18, M6-1, M8-1.25, or M10-1.5, and the overmolded mounting stud 205 is provided in lengths of several increments, according to need.

Figure 11:
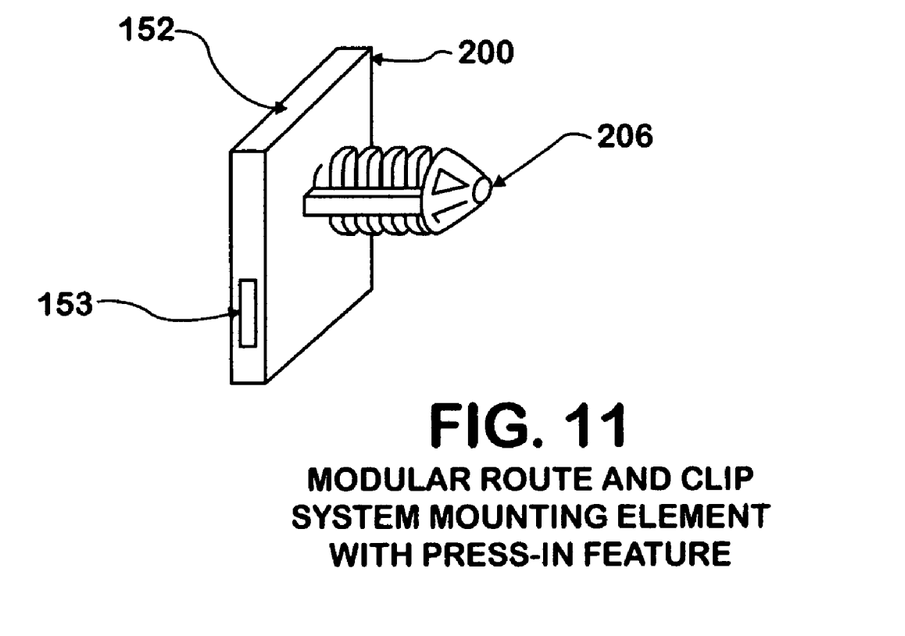
FIG. 11—A view of a tenth embodiment of the present invention.

FIG. 11 shows a view of a modular route and clip system mounting element 200 having a press-in feature 206. The modular route and clip system mounting element 200 has an element body 152 and interlocking features 153, which interlocking features 153 are only partially shown in FIG. 11. By means of the interlocking features 153, the modular route and clip system mounting element 200 may be connected to other modular route and clip system elements 151 (not shown). The press-in feature 206 allows the modular route and clip system mounting element 200 to be affixed to a mating hole, and firmly retained without the use of tools or compatible fasteners.

Figure 12:
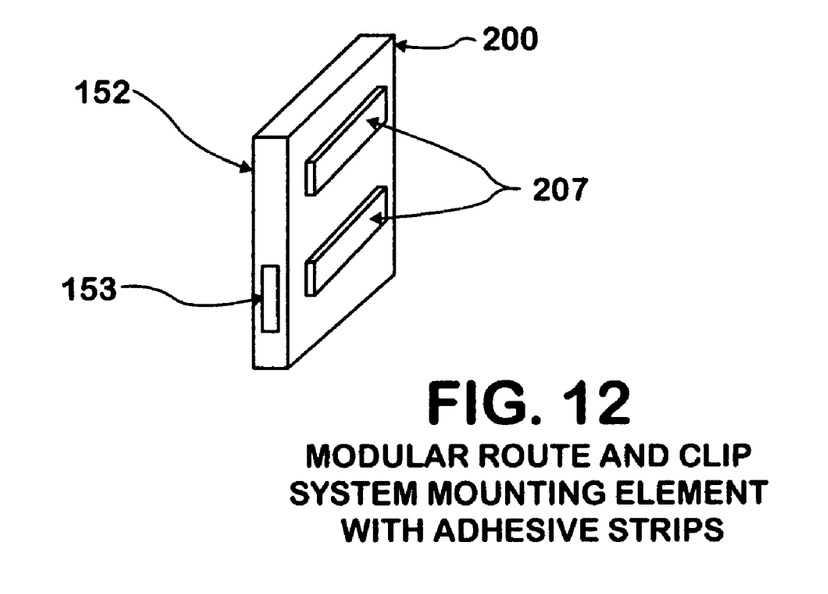
FIG. 12—A view of an eleventh embodiment of the present invention.

FIG. 12 shows a view of a modular route and clip system mounting element 200 having adhesive strips 207. The modular route and clip system mounting element 200 has an element body 152 and interlocking features 153, which interlocking features 153 are only partially shown in FIG. 12. By means of the interlocking features 153, the modular route and clip system mounting element 200 may be connected to other modular route and clip system elements 151 (not shown). The adhesive strips 207 allow the modular route and clip system mounting element 200 to be affixed to a mating surface, and firmly retained without the use of tools or compatible fasteners.

Figure 13:
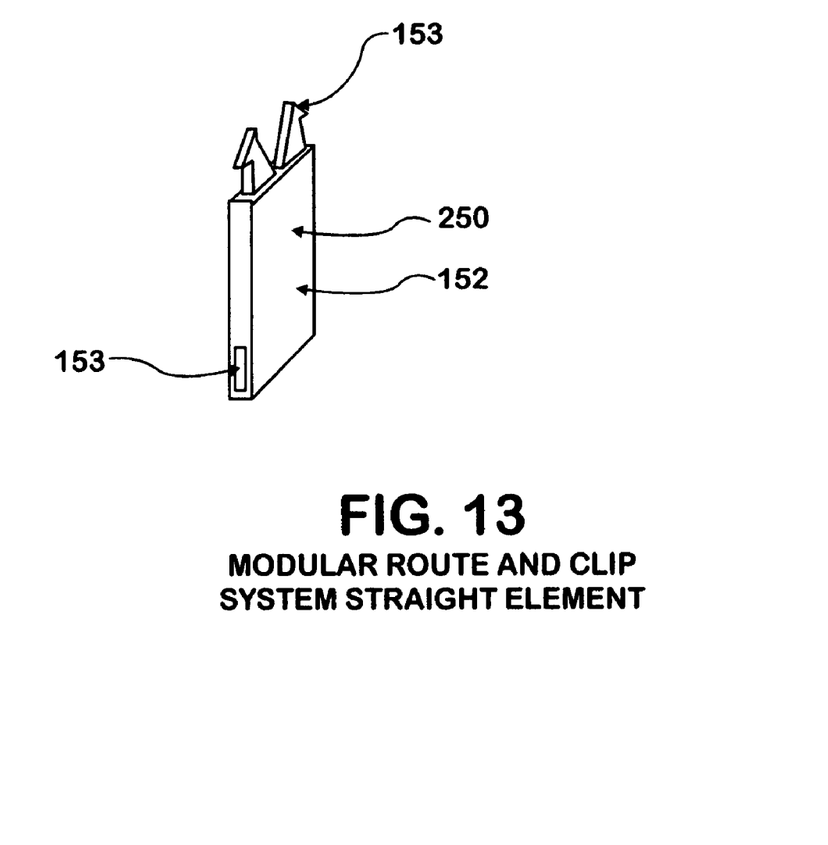
FIG. 13—A view of a twelfth embodiment of the present invention.

FIG. 13 shows a view of a modular route and clip system straight element 250. The modular route and clip system straight element 250 has an element body 152 and interlocking features 153, by means of which the modular route and clip system straight element 250 may be connected to other modular route and clip system elements 151 (not shown). The modular route and clip system straight element 250 is provided in length increments from interlocking feature 153 to interlocking feature 153 of about fifteen millimeters from about fifteen millimeters to about sixty millimeters, in length increments of about half an inch from about half an inch to about two and a half inches.

Figure 14:
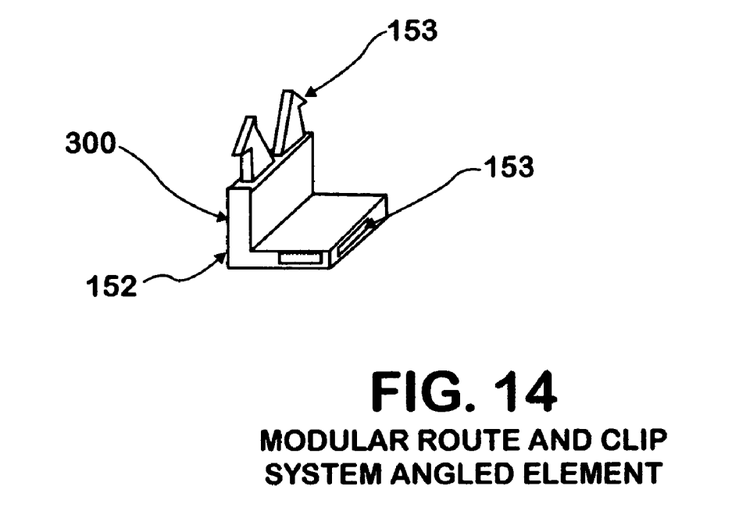
FIG. 14—A view of a thirteenth embodiment of the present invention.

FIG. 14 shows a view of a modular route and clip system angled element 300. The modular route and clip system angled element 300 has an element body 152 and interlocking features 153, by means of which the modular route and clip system angled element 300 may be connected to other modular route and clip system elements 151 (not shown). The modular route and clip system angled element 300 is provided in angle increments of about 7.5°, 15°, 30°, 45°, 60°, and 90°.

Figure 15:
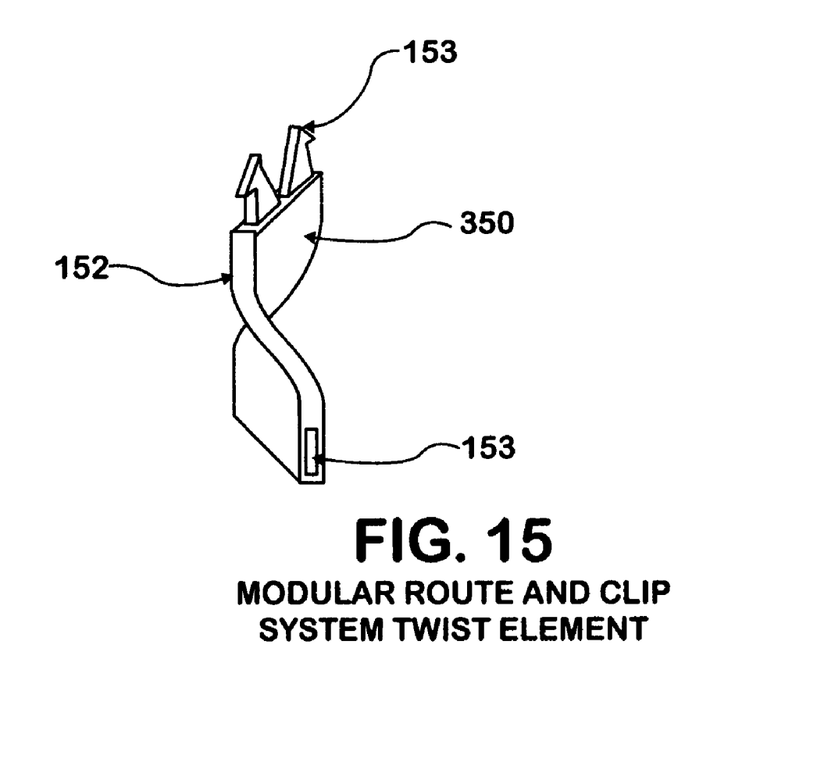
FIG. 15—A view of a fourteenth embodiment of the present invention.

FIG. 15 shows a view of a modular route and clip system twist element 350. The modular route and clip system twist element 350 has an element body 152 and interlocking features 153, by means of which the modular route and clip system twist element 350 may be connected to other modular route and clip system elements 151 (not shown). The modular route and clip system twist element 350 is provided in angle increments of about 7.5°, 15°, 30°, 45°, 60°, and 90°.

Figure 16:
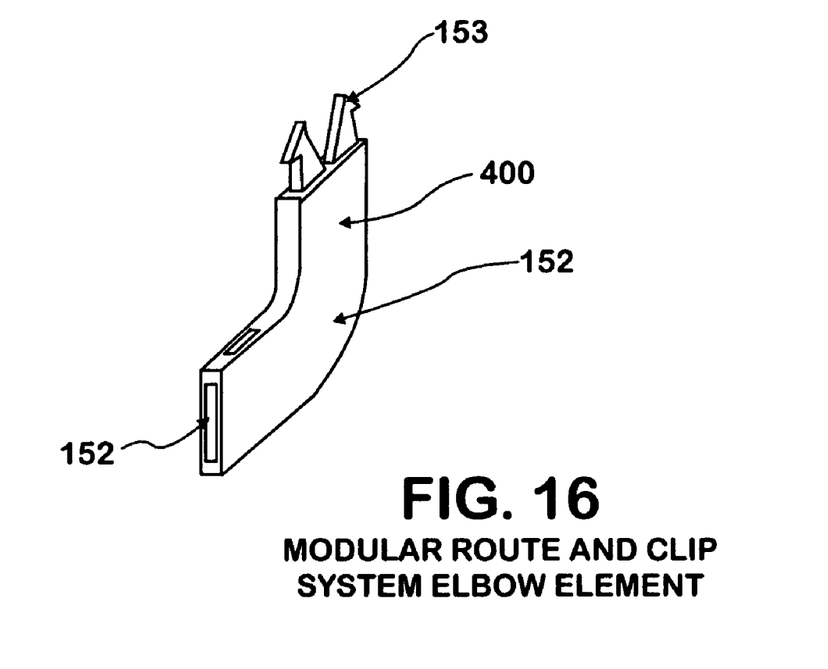
FIG. 16—A view of a fifteenth embodiment of the present invention.

FIG. 16 shows a view of a modular route and clip system elbow element 400. The modular route and clip system elbow element 400 has an element body 152 and interlocking features 153, by means of which the modular route and clip system elbow element 400 may be connected to other modular route and clip system elements 151 (not shown).

Figure 17:
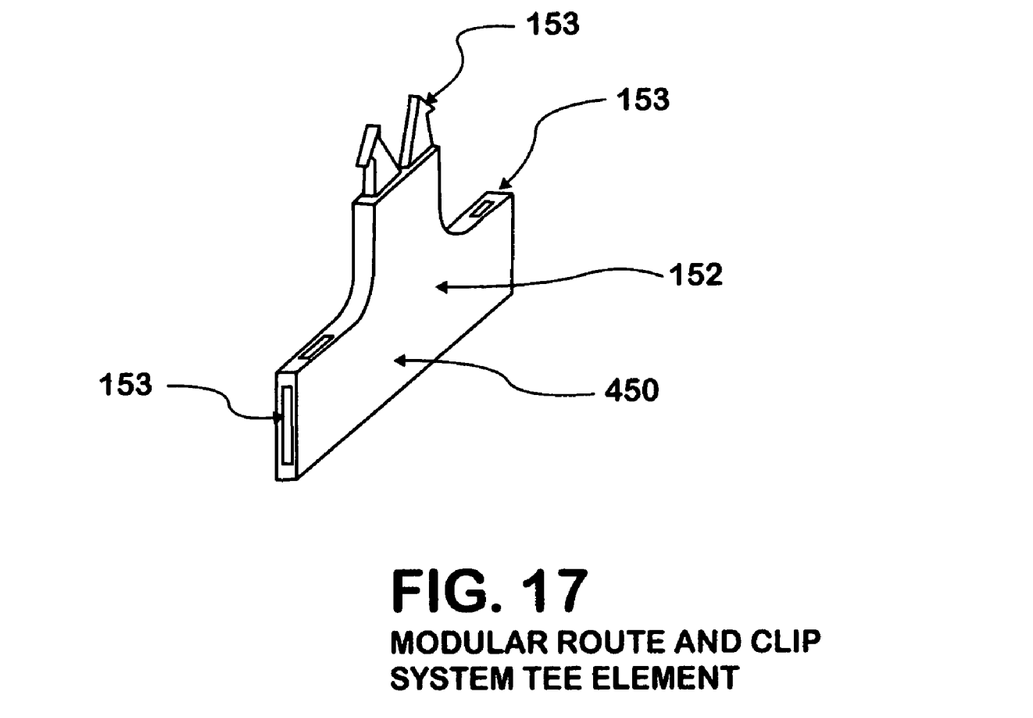
FIG. 17—A view of a sixteenth embodiment of the present invention.

FIG. 17 shows a view of a modular route and clip system tee element 450. The modular route and clip system tee element 450 has an element body 152 and interlocking features 153, by means of which the modular route and clip system tee element 450 may be connected to other modular route and clip system elements 151 (not shown).

Figure 18:
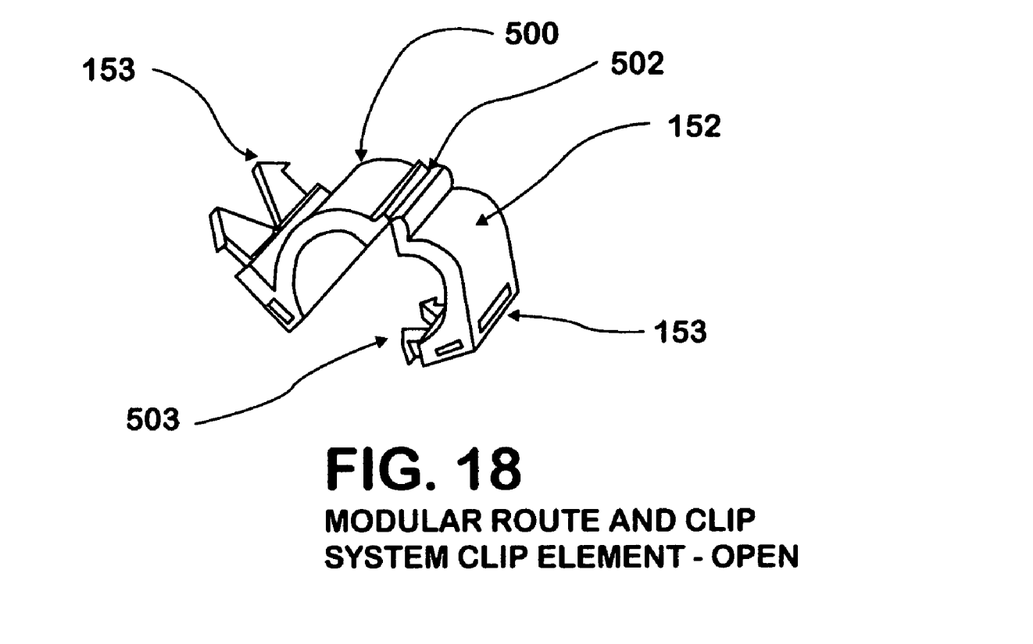
FIG. 18—A view of a seventeenth embodiment of the present invention.

FIG. 18 shows a view of a modular route and clip system line clipping element 500 in the open position. The modular route and clip system line clipping element 500 has an element body 152 and interlocking features 153, by means of which the modular route and clip system line clipping element 500 may be connected to other modular route and clip system elements 151 (not shown). Further, the modular route and clip system line clipping element 500 is configured with a living hinge 502 and an interlocking closure 503, such that the modular route and clip system line clipping element 500 may be opened as shown, a line to be routed 104 (not shown) may be inserted therein, and the modular route and clip system line clipping element 500 closed, thereby engaging the interlocking closure 503 and securely retaining the line to be routed 104 (not shown).

Figure 19:
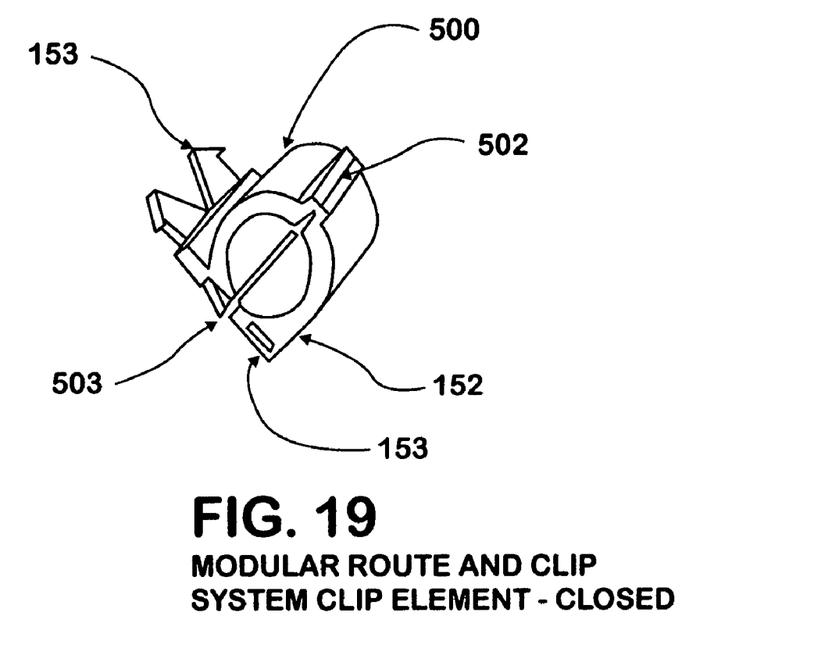
FIG. 19—A view of an eighteenth embodiment of the present invention.

FIG. 19 shows a view of a modular route and clip system line clipping element 500, similar to the modular route and clip system line clipping element 500 shown in FIG. 18. The modular route and clip system line clipping element 500 shown in FIG. 19 again has an element body 152, interlocking features 153, a living hinge 502, and an interlocking closure 503. The modular route and clip system line clipping element 500 is shown in the closed position with the interlocking closure 503 securely engaged.

Figure 20:
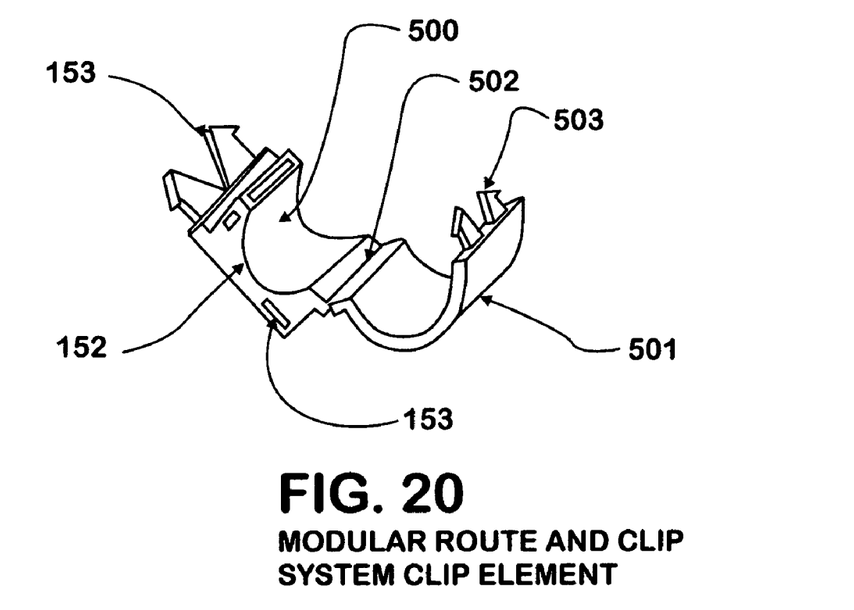
FIG. 20—A view of a nineteenth embodiment of the present invention.

FIG. 20 shows a view of a modular route and clip system line clipping element 500 in the open position, similar to the modular route and clip system line clipping element 500 shown in FIG. 18. The modular route and clip system line clipping element 500 shown in FIG. 20 again has an element body 152, interlocking features 153, a living hinge 502, and an interlocking closure 503. Additionally, the modular route and clip system line clipping element 500 has a separate retaining portion 501. The living hinge 502 and the interlocking closure 503 are positioned on planes perpendicular to the axis of the modular route and clip system line clipping element 500, such that the retaining portion 501 may be in the open position when the modular route and clip system line clipping element 500 is installed between other modular route and clip system elements 151 (not shown).

Figure 21:
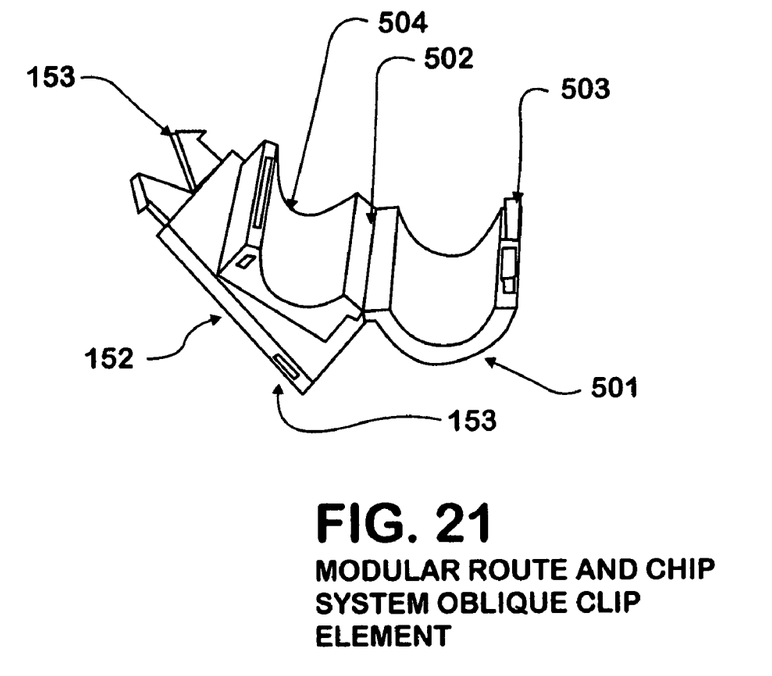
FIG. 21—A view of a twentieth embodiment of the present invention.

FIG. 21 shows a view of a modular route and clip system oblique line clipping element 504 in the open position, similar to the modular route and clip system line clipping element 500 shown in FIG. 20. The modular route and clip system oblique line clipping element 504 shown in FIG. 21 again has an element body 152, interlocking features 153, a separate retaining portion 501, a living hinge 502, and an interlocking closure 503. The living hinge 502 and the interlocking closure 503 are positioned oblique to the axis of the element body 152, such that the line to be routed 104 (not shown) is at an angle to the axis of the element body 152 when in the installed position. The angle between the installed position of the line to be routed 104 (not shown) and the axis of the element body 152 depends on the configuration of the modular route and clip system oblique line clipping element 504, which may be provided in angle increments of about 82.5°, 75°, 60°, 45°, 30°, and 0°.

Figure 22:
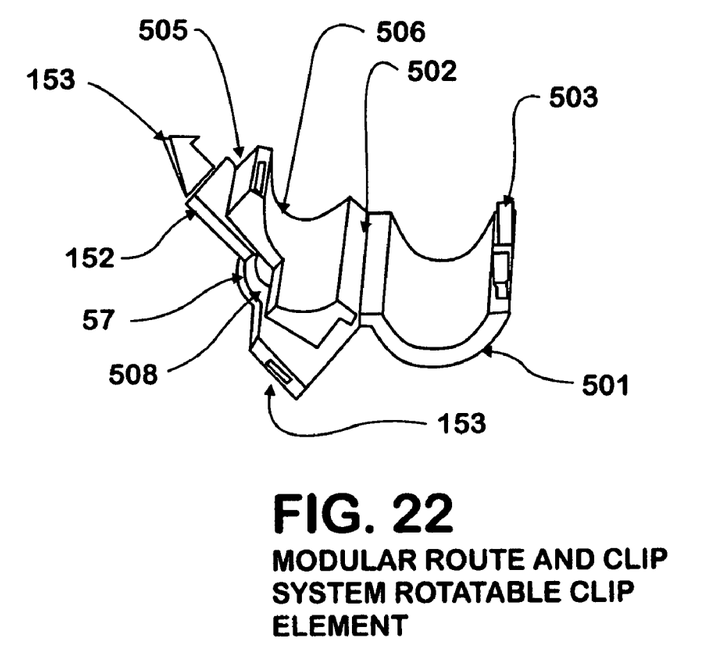
FIG. 22—A view of a twenty first embodiment of the present invention.

FIG. 22 shows a partial view of a modular route and clip system rotatable line clipping element 505 in the open position, similar to the modular route and clip system line clipping element 500 shown in FIG. 20. The modular route and clip system rotatable line clipping element 505 shown in FIG. 22 again has an element body 152, interlocking features 153, a separate retaining portion 501, a living hinge 502, and an interlocking closure 503. However, the element body 152 of the modular route and clip system rotatable line clipping element 505 is further provided with a rotatable body 506 of which the separate retaining portion 501, the living hinge 502, and the interlocking closure 503 are part. The rotatable body 506 is provided with a pivot pin 507, which is securely retained and free to pivot within a pivot hole 508 provided in the element body 152. In this way, the line to be routed 104 (not shown) is free to rotate relative to the axis of the element body 152 when in the installed position.

Figure 23:
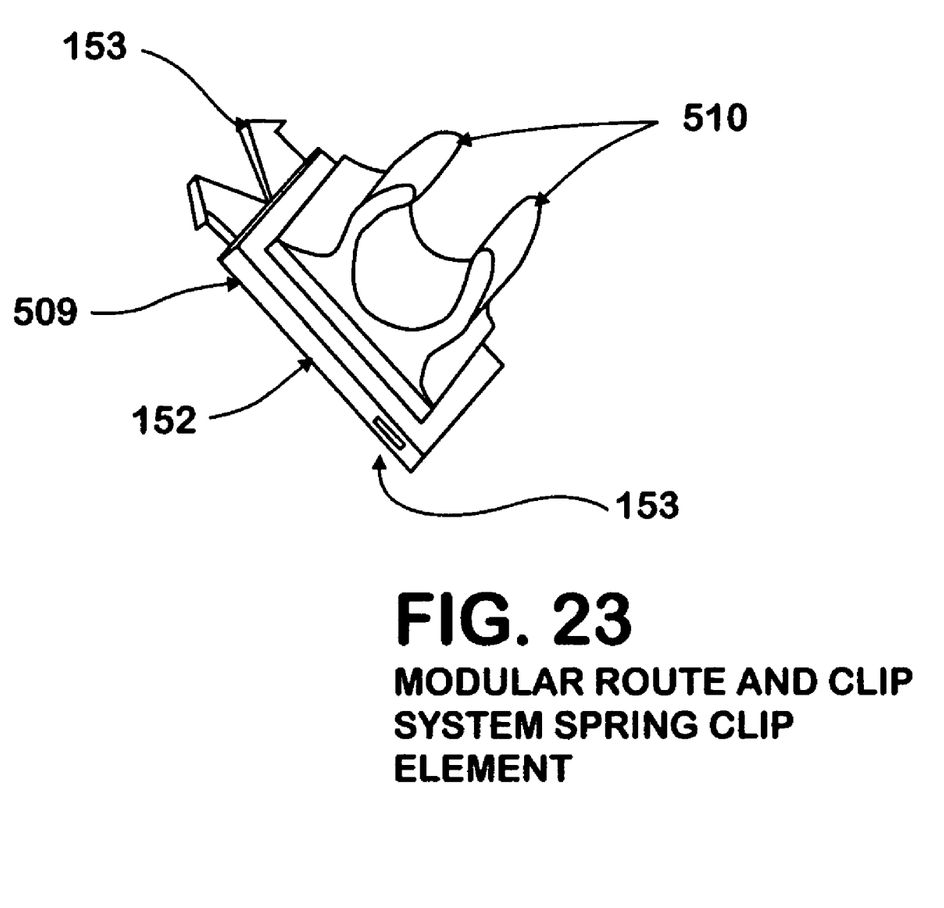
FIG. 23—A view of a twenty second embodiment of the present invention.

FIG. 23 shows a view of a modular route and clip system resilient line clipping element 509. The modular route and clip system resilient line clipping element 509 has an element body 152 and interlocking features 153, by means of which the modular route and clip system resilient line clipping element 509 may be connected to other modular route and clip system elements 151 (not shown). Further, the modular route and clip system resilient line clipping element 509 is configured with resilient fingers 510, which are spaced apart at a distance less than the diameter of a line to be routed 104 (not shown), such that when the line to be routed 104 (not shown) is pressed therebetween, it is securely retained.

Other permutations of the invention are possible without departing from the teachings disclosed herein, provided that the function of the invention is to reduce or eliminate the number of routing clips and brackets by providing a modular system of clip sub-components that can be assembled as needed, which clips have interlocking features and are generally configured as mounting elements, extension elements, angled elements, twist elements, and clip elements. Other advantages to a modular system of clip sub-components may also be inherent in the invention, without having been described above.

We claim:

1. A modular system of routing clip elements, comprising: at least two routing clip elements, the first routing clip element of said at least two routing clip elements being a mounting element and having an element body, a mounting feature, and at least one interlocking feature, the second routing clip element of said at least two routing clip elements having an element body and at least two interlocking features, one of said at least two interlocking features of said second routing clip element being operable to attach to said at least one interlocking feature of said first routing clip element in order to connect said second routing clip element to said first routing clip element, another of said at least two interlocking features of said second routing clip element being operable to attach to interlocking features on further routing clip elements.

2. The modular system of routing clip elements of claim 1, wherein:
said one of said at least two interlocking features of said second routing clip element further comprises at least one barbed protrusion; and
said interlocking feature of said first routing clip element further comprises at least one recess compatible with said at least one barbed protrusion.

3. The modular system of routing clip elements of claim 1, wherein:
said element body of said first routing clip element is further provided with a mounting hole.

4. The modular system of routing clip elements of claim 3, wherein:
said mounting hole is further provided with screw threads.

5. The modular system of routing clip elements of claim 1, wherein:
said element body of said first routing clip element is further provided with an overmolded insert, said overmolded insert having a mounting hole.

6. The modular system of routing clip elements of claim 5, wherein:
said mounting hole is further provided with screw threads.

7. The modular system of routing clip elements of claim 1, wherein:
said element body of said first routing clip element is further provided with a mounting stud.

8. The modular system of routing clip elements of claim 1, wherein:
said element body of said first routing clip element is further provided with an overmolded insert, said overmolded insert being in the form of a mounting stud.

9. The modular system of routing clip elements of claim 1, wherein:
said element body of said first routing clip element is further provided with a press-in mounting feature.

10. The modular system of routing clip elements of claim 1, wherein:
said element body of said first routing clip element is further provided with at least one adhesive strip.

11. The modular system of routing clip elements of claim 1, wherein:
a third routing clip element of said at least two routing clip elements further comprises an extension element, said third routing clip element having an element body and at least two interlocking features, said at least two interlocking features being operable to attach to said interlocking features of said first routing clip element and to said interlocking features of said second routing clip element.

12. The modular system of routing clip elements of claim 1, wherein:
a third routing clip element of said at least two routing clip elements further comprises an angle element, said third routing clip element having an element body and at least two interlocking features, said at least two interlocking features being operable to attach to said interlocking features of said first routing clip element and to said interlocking features of said second routing clip element.

13. The modular system of routing clip elements of claim 1, wherein:
a third routing clip element of said at least two routing clip elements further comprises a twist element, said third routing clip element having an element body and at least two interlocking features, said at least two interlocking features being operable to attach to said interlocking features of said first routing clip element and to said interlocking features of said second routing clip element.

14. The modular system of routing clip elements of claim 1, wherein:
a third routing clip element of said at least two routing clip elements further comprises an elbow element, said third routing clip element having an element body and at least two interlocking features, said at least two interlocking features being operable to attach to said interlocking features of said first routing clip element and to said interlocking features of said second routing clip element.

15. The modular system of routing clip elements of claim 1, wherein:
a third routing clip element of said at least two routing clip elements further comprises a tee element, said third routing clip element having an element body and at least two interlocking features, said at least two interlocking features being operable to attach to said interlocking features of said first routing clip element and to said interlocking features of said second routing clip element.

16. The modular system of routing clip elements of claim 1, wherein:
said living hinge and said interlocking closure of said second routing clip element are oriented at an oblique angle to said element body of said second routing clip element.

17. The modular system of routing clip elements of claim 1, wherein:
said second routing clip element is further provided with a rotatable body, said rotatable body being provided with a pivot pin, said element body of said second routing clip element being provided with a pivot hole, said pivot pin being engaged to said pivot hole; and
said living hinge and interlocking closure being located upon said rotatable body.

* * * * *